United States Patent
Altinger et al.

(10) Patent No.: US 10,157,544 B2
(45) Date of Patent: Dec. 18, 2018

(54) METHOD FOR DETERMINING POSITION DATA FOR USE DURING THE OPERATION OF A VEHICLE SYSTEM OF A MOTOR VEHICLE, AND POSITION-DATA DETERMINING AND DISTRIBUTING SYSTEM

(71) Applicant: AUDI AG, Ingolstadt (DE)

(72) Inventors: Harald Altinger, Gerolfing (DE); Florian Schuller, Ismaning (DE); Andre Ibisch, Dortmund (DE)

(73) Assignee: Audi AG, Ingolstadt (DE)

( * ) Notice: Subject to any disclaimer, the term of this patent is extended or adjusted under 35 U.S.C. 154(b) by 36 days.

(21) Appl. No.: 15/316,812

(22) PCT Filed: Apr. 24, 2015

(86) PCT No.: PCT/EP2015/000851
§ 371 (c)(1),
(2) Date: Dec. 6, 2016

(87) PCT Pub. No.: WO2015/188905
PCT Pub. Date: Dec. 17, 2015

(65) Prior Publication Data
US 2018/0151072 A1 May 31, 2018

(30) Foreign Application Priority Data
Jun. 12, 2014 (DE) .................. 10 2014 008 578

(51) Int. Cl.
*G06K 9/00* (2006.01)
*G08G 1/16* (2006.01)
(Continued)

(52) U.S. Cl.
CPC ......... *G08G 1/164* (2013.01); *G06K 9/00771* (2013.01); *G08G 1/0116* (2013.01); *G08G 1/04* (2013.01); *H04W 4/44* (2018.02)

(58) Field of Classification Search
USPC ......................................................... 382/104
See application file for complete search history.

(56) References Cited

U.S. PATENT DOCUMENTS 6,898,498 B1 * 5/2005 Wessels .............. B60R 21/0132
180/274
7,136,754 B2 11/2006 Hahn et al.
(Continued)

FOREIGN PATENT DOCUMENTS

CN  102693637 A  9/2012
CN  103208205 A  7/2013
(Continued)

OTHER PUBLICATIONS

Translation of International Preliminary Report on Patentability directed to related International Patent Application No. PCT/EP2015/000851, dated Dec. 15, 2016; 6 pages.
(Continued)

*Primary Examiner* — Jerome Grant, II
(74) *Attorney, Agent, or Firm* — Sterne, Kessler, Goldstein & Fox, PLLC

(57) ABSTRACT

A method for determining positional data for use in the operation of a vehicle system (3) of a motor vehicle (2), wherein image data of at least one surveillance camera (9, 10, 11) recording at least a portion of the surroundings of the motor vehicle (2) and/or the motor vehicle (2), provided externally to the motor vehicle (2) for determining the positional data of at least one recorded object (13) are evaluated and made at least partially available to the vehicle system (3).

24 Claims, 3 Drawing Sheets

Figure 1:
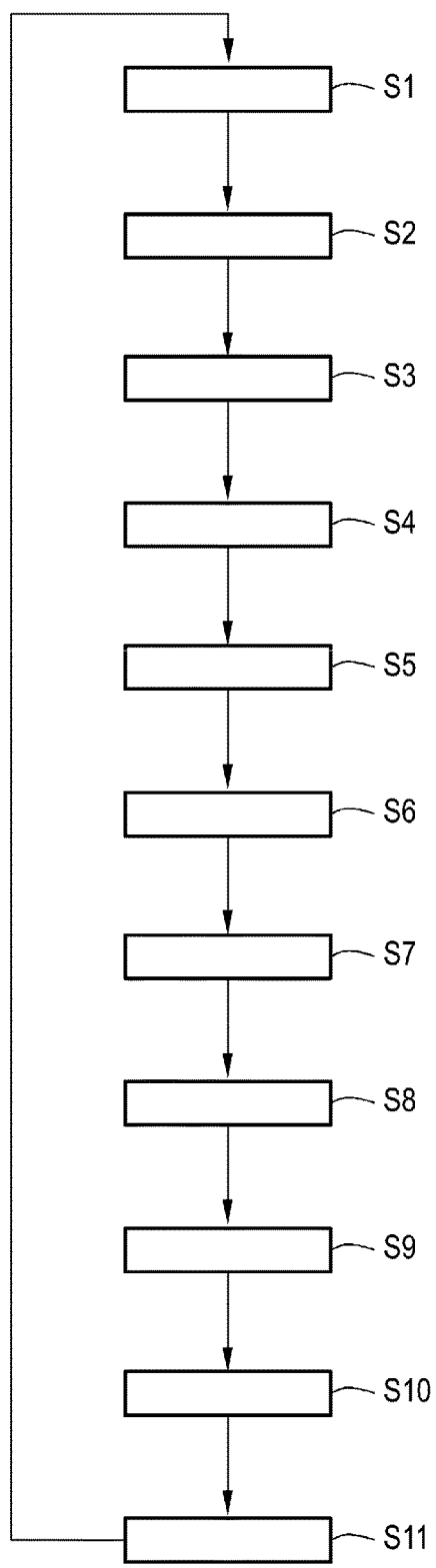

(51) Int. Cl.
*G08G 1/04* (2006.01)
*H04W 4/44* (2018.01)
*G08G 1/01* (2006.01)

(56) References Cited

U.S. PATENT DOCUMENTS

| | | | |
|---|---|---|---|
| 9,592,764 B2* | 3/2017 | Randler | B60Q 9/008 |
| 9,963,106 B1* | 5/2018 | Ricci | B60R 25/2018 |
| 2007/0225872 A1* | 9/2007 | Luebke | G08G 1/017 |
| | | | 701/1 |
| 2007/0229661 A1* | 10/2007 | Aoki | B60R 21/01538 |
| | | | 348/148 |
| 2008/0015772 A1 | 1/2008 | Sanma et al. | |
| 2010/0100324 A1 | 4/2010 | Caminiti et al. | |
| 2010/0100325 A1 | 4/2010 | Lovell et al. | |
| 2012/0242505 A1 | 9/2012 | Maeda et al. | |
| 2014/0063196 A1 | 3/2014 | Daniel | |
| 2015/0009285 A1* | 1/2015 | Morishima | B60R 1/00 |
| | | | 348/36 |
| 2015/0025795 A1* | 1/2015 | Firl | G01C 21/3602 |
| | | | 701/461 |
| 2015/0035981 A1* | 2/2015 | Otsuki | G08G 1/09623 |
| | | | 348/148 |
| 2016/0241816 A1* | 8/2016 | Noguchi | B62J 11/00 |
| 2017/0222612 A1* | 8/2017 | Zollner | G08G 1/167 |
| 2017/0255824 A1* | 9/2017 | Miller | G06K 9/00624 |
| 2017/0277716 A1* | 9/2017 | Giurgiu | G06F 17/30241 |
| 2018/0023972 A1* | 1/2018 | Lei | G01C 21/3626 |
| | | | 701/467 |
| 2018/0051992 A1* | 2/2018 | Croyle | G01C 21/28 |
| 2018/0053422 A1* | 2/2018 | Altinger | G08G 1/20 |
| 2018/0101177 A1* | 4/2018 | Cohen | G05D 1/0246 |

FOREIGN PATENT DOCUMENTS

| | | |
|---|---|---|
| CN | 103680142 A | 3/2014 |
| DE | 10 2004 035 856 A1 | 3/2005 |
| DE | 10 2007 032 814 A1 | 1/2008 |
| DE | 11 2010 005 395 T5 | 12/2012 |
| EP | 1 302 365 A2 | 4/2003 |
| EP | 1 470 958 A2 | 10/2004 |
| WO | 2013/102518 A1 | 7/2013 |

OTHER PUBLICATIONS

Jacques et al., "Background Subtraction and Shadow Detection in Grayscale Video Sequences," *18th Brazilian Symposium on Computer Graphics and Image Processing*, Natal, Brazil, Oct. 9-12, 2005, pp. 189-196. (4 pages).
English-language abstract of Chinese Patent Application Publication No. CN 102693637 A, published Sep. 26, 2012; 1 page.
English-language abstract of Chinese Patent Application Publication No. CN 103208205 A, published Jul. 17, 2013; 1 page.
English-language abstract of Chinese Patent Application Publication No. CN 103680142 A, published Mar. 26, 2014; 1 page.
International Search Report and Written Opinion of the International Searching Authority directed to related International Patent Application No. PCT/EP2015/000851, dated Jul. 13, 2015, with attached English-language translation; 15 pages.

* cited by examiner

METHOD FOR DETERMINING POSITION DATA FOR USE DURING THE OPERATION OF A VEHICLE SYSTEM OF A MOTOR VEHICLE, AND POSITION-DATA DETERMINING AND DISTRIBUTING SYSTEM

The invention relates to a method for determining positional data for use during the operation of a vehicle system of a motor vehicle as well as a positional data determination and distribution system.

Vehicle systems of modern motor vehicles, for example advanced driver assistance systems, use a plurality of information derived from sensor data, in order to successfully implement their respective functions. One important type of such is information is positional data, whether it is related to one's own vehicle or to other traffic participants/objects. However, positional data of other objects in surroundings around the motor vehicle cannot always be completely recorded by environmental sensors of the motor vehicle, while several methods are usually merged in the case of determining one's own position, for example, the consideration of odometry together with a global navigation satellite system (GNSS). If one of these determination types is omitted or if it is inaccurate by nature, there can quickly be inaccuracies in the positional data of one's own vehicle.

This is especially relevant if a vehicle system is used that is designed for fully automatic (highly automated or piloted) operation of the motor vehicle. While currently the driver of the motor vehicle must ensure for himself that his motor vehicle does not collide with an object or travels the correct path, which means in the event of damage the driver is responsible for an accident, there must be a highly accurate protection with such vehicle systems designed for fully automatic operation of a motor vehicle ("highly automated vehicle system"). Thus, for self-driving, fully automatically operated (piloted) motor vehicles, for one thing, the most current possible position of one's own motor vehicle is necessary, wherein the positional data describing this, if determined by the vehicle sensors, can have inaccuracies due to sensor drift, noise, unclear measurements and the like. However, the position of other objects, in particular movable objects, also represents an important input parameter for accident-free, fully automatic operation of a motor vehicle. Here, as already mentioned, the difficulties exist that the sensors cannot always (sufficiently precisely) record all the relevant objects in the surroundings of the motor vehicle, in particular if they are outside of the detection range of the environmental sensor.

DE 10 2004 035 856 A1 describes an electrical auxiliary device for mounting on a support tube of a transportation facility, such as for example a traffic sign, a traffic light, a traffic reflector post as well as a beacon, said electrical auxiliary device having electronic means with a sensor device for recording road traffic data and/or a data transmitter for sending road traffic data. Such a transportation facility with an electrical auxiliary device can be part of an anti-collision system, in which traffic information and road traffic data are processed further by a vehicle control unit, which can act on a braking system of the motor vehicle and/or trigger a safety device of the motor vehicle.

From DE 11 2010 005 395 T5 a road-vehicle cooperative driving safety support device is known, wherein when it is determined that it is necessary to attract the attention of a driver of a vehicle, screen information comprising a target detection area in the vehicle is displayed. In the process, information on the speed and position of obstacles is calculated in an image recorded by means of an image sensor installed at a roadside, sent to a roadside device and forwarded to a vehicle for the output of screen information by an infrared beacon.

DE 10 2007 032 814 A1 discloses a system for providing information for vehicle support in a vehicle. To this end an on-board vehicle support unit actuates a display device for outputting the information and communicates with an on-board device installed in a support zone. This device receives image data of a camera which records the support zone and wirelessly forwards it to the vehicle.

Therefore, the invention addresses the problem of specifying an option for improving the database in the determination of the position in motor vehicles by adding a further source for positional data.

In accordance with the invention, a method with the features of claim 1 of the patent is provided for the solution of this problem.

In the process, if mention is made of the surroundings of the motor vehicle, this can in particular be a predefined relevance range, for example in particular navigable regions in a specified radius around the motor vehicle and the like.

The invention therefore proposes expanding the database by using external sources, in concrete terms surveillance cameras. Surveillance cameras are already well known in many areas of daily life and thus also in traffic, and are ordinarily used to monitor specified areas, in particular with regard to security. These surveillance cameras are now also used within the framework of the present invention to track a motor vehicle and/or further objects. Thus, in the case that the positional data relate to the position of one's own motor vehicle as an object, an external, additional, redundant position specification can be made available, which can be used for review or for increasing the total quality of a determination of the position of the motor vehicle. If the positional data relate to objects not corresponding to the motor vehicle, for example further traffic participants, this redundancy is also present if the objects can also be recorded with environmental sensors of the motor vehicle. In particular, however, the opportunity arises to obtain information about objects on the part of the motor vehicle that lies outside of the detection range of the environmental sensor of the motor vehicle itself. This enables an early reaction to these objects, in particular in the case of the use of a highly automated vehicle system designed for fully automatic operation of the motor vehicle. Of course, vehicle warning systems can also use the positional data, for example if it should be necessary to give warning about a pedestrian who is not yet visible or the like.

As already mentioned, the present method can be used particularly advantageously if a vehicle system is designed for at least partially, in particular completely, automatic operation of the motor vehicle. Such highly automated vehicle systems are in particular dependent on comprehensive and exact information about the motor vehicle itself and its surroundings in order to be able to predict and track the most optimum, secure vehicle trajectories. Here the surveillance cameras that the inventive method employs supply an extremely useful data source, which ultimately can be understood as an additional external environmental sensor and/or an additional external position sensor of the motor vehicle. One targeted field of application for the piloted operation of motor vehicles is parking environments, in particular parking garages, where surveillance cameras are frequently already installed anyway for monitoring purposes. For another thing, however, such parking environments often have visual obstacles, such as other motor vehicles and/or walls and/or plants or the like, so that if necessary objects in the surroundings of the motor vehicle can lie outside of the detection range of the environmental sensor of the motor vehicle, but can be recorded by the surveillance camera, so that an early adaptation of the planned trajectory is possible to prevent a collision. Other vehicle systems in which the positional data can be useful are advanced driver assistance systems for warning the driver which evaluate the relative position and, if necessary, the speed of other objects for the determination of a warning information item.

As already mentioned, one advantageous embodiment of the inventive method provides that positional data of the motor vehicle itself are determined and transmitted to it. Therefore, the positional data describe (at least) the motor vehicle's own position, which should then be redundant, after other sources for determining one's own position, thus for further positional data, are available within the motor vehicle. However, in order to transmit positional data, such as one's own positional data to a specified motor vehicle, positional data of an object determined from the image data of the surveillance camera must be able to be assigned to the correct motor vehicle.

In this context, an improvement of the method provides that the motor vehicle, with the assistance of a distance traveled and/or a further available position, in particular transmitted from the motor vehicle and/or with the assistance of at least one external feature of the motor vehicle, in particular of a license plate and/or of a model designation badge, in which image data of at least one of the at least one surveillance camera are identified outside of the motor vehicle. If the motor vehicle is operated in a highly automated manner, which has already been covered in detail, it is normal to make the planned trajectory and/or a current position of a control device assigned to the current navigated area accessible, with which there is a communication link anyway, for example via WLAN. If positions/navigated routes are known from the image data and also from communications data of motor vehicles, they can be compared, so that a motor vehicle is unambiguously established and thus identified. Thus, an allocation of the objects detected in the image data to communications partners is done in this manner, and of course can be useful even if the positional data do not relate to one's own motor vehicle. Expediently, objects that have been detected and identified, in particular motor vehicles, are continuously tracked as long as there is at least one surveillance camera in the detection range, which will be elaborated in the following. Other possibilities for the identification of motor vehicle for example relate to information that can be obtained from the image data itself, for example the license plate number which can be read from a license plate and the like.

In the process, it should be pointed out here that the allocation of objects detected in the image data to communications partners does not necessarily have to occur, since it is definitely possible to transmit all objects detected from the image data or even the image data itself to the motor vehicle, where the further evaluation/sorting can then take place.

A further exemplary embodiment in this context provides that the positional data of the motor vehicle itself are used as redundant information about further positional data of the motor vehicle itself determined by the motor vehicle, in particular for determination of final position information from the positional data and the further positional data and/or for the review of further positional data and/or position information derived from it. Thus, the positional data determined with the help of the image data of the surveillance camera can be directly included in the determination of final position information describing a position to be used, or can also be used as a plausibility criterion in order to assess the credibility of further positional data and/or of position information. In this context reference is often made to position probability or the confidence interval of the position.

As an alternative or preferably in addition to the position of the motor vehicle itself, the positional data of at least one object not corresponding to the motor vehicle can be transmitted as positional data to the motor vehicle, which can be used in a variety of ways in the operation of the vehicle system. Thus, provision can be made that positional data of at least one object not corresponding to the motor vehicle are considered in the creation of an environmental model of the surroundings of the motor vehicle. Such environmental models, which can for example describe all objects in a defined environment of the motor vehicle and/or the allocation state sub-ranges of the defined environment, have already been proposed in the prior art. Generally, such environmental models are compiled from data determined from the motor vehicle itself, wherein, however, the positional data determined externally by surveillance cameras also offer an outstanding expansion of the database in this context. Positional data of at least one object not corresponding to the motor vehicle can further be considered in the determination of a collision probability with the object and/or in the determination of at least one future trajectory of the motor vehicle. This is expedient in particular with regard to a highly automated, piloted operation of the motor vehicle. Corresponding functions of vehicle systems are widely known in the prior art and do not need to be explained in great detail here.

Provision can be made that the in particular at least partially evaluated image data for further evaluation and/or the positional data in particular are transmitted to the motor vehicle, as already indicated. This transmission can take place in particular by a control device assigned to a navigated area, for example a parking environment, which is connected to at least one surveillance camera. Motor vehicles usually communicate with such a control device, which correspondingly has a suitable communications device, within the area anyway, for example via a WLAN connection or some other communication link. Thus, it is appropriate to collect the data on the part of the control device and transmit it there via the existing communication link to the motor vehicle, wherein preferably the positional data are already determined on the part of the surveillance camera itself, an image processing device in particular assigned to the surveillance cameras and/or the control device by evaluation of the image data.

One advantageous improvement of the invention provides that in addition to the objects detected by the at least one surveillance camera also at least one object information item associated with the positional data of the object is determined and in particular at least partially transmitted to the motor vehicle. Thus, it is possible to also derive further properties of the at least one recorded object from the image data, which can be put to good use by a device connected to the camera and/or the motor vehicle. In the process, provision can in particular be made that an object class and/or an identification information item and/or a speed and/or a movement history and/or a movement prediction is determined to be an object information item. This object information can be used not only for example to assign a detected object to a communications partner of a (or the) control device, but rather can also be used to perform a prefiltering to the extent of specifying which image data or positional data are to be transmitted to which motor vehicle and the like, which will be elaborated in the following. Furthermore, it is of course conceivable to use and evaluate functions of the (or a) control device assigned to the driven area.

In accordance with the invention, provision is made that for every surveillance camera and/or by combining positional data related to the same objects for all surveillance cameras, position lists are created which contain the positional data for moved objects tracked by at least one surveillance camera. Such position lists can also contain object information items, as has been described. In this way, an especially suitable representation of the evaluation results of the image data is made possible. There are a variety of possibilities for assigning the same objects, recorded by different surveillance cameras, to one another, which preferably can also be cumulatively used. Thus, one possibility for locating identical objects that were detected by different surveillance cameras provides for the performance of a position adjustment, wherein expediently in the determination of object information an adjustment can also take place in this regard. This way redundant objects can be prevented in the position lists. Of course it is also conceivable, whenever positional data for a specified object are available from several surveillance cameras, to include it through statistical evaluation in the positional data for the object, said positional data finally being available in the position list. For example, a mean, in particular also a mean preferably weighted with error values can be determined or the like. Thus, generally speaking a merge can take place, i.e. a merging of positional data of various sources for a single object.

Such position lists are determined with special advantage on the part of the surveillance camera itself, image processing devices assigned to said surveillance camera and/or a control device assigned to the driven area, that is connected to the surveillance cameras. Then a prefiltering of the positional data to be transmitted to a motor vehicle is possible, in particular thus reducing the position list.

Thus, provision is further made in accordance with the invention that in the event of a transmission of positional data with objects not corresponding to the motor vehicle a position list filtered for the motor vehicle using at least one relevance criterion is transmitted as a position list to the motor vehicle. Thus, a check is performed as to whether the objects are relevant for the motor vehicle, wherein said objects only remain in the position list for the motor vehicle in the event of relevance and thus are transmitted to the motor vehicle as positional data.

In concrete terms, provision can thus be made that a relevance criterion considering a future driving path of the motor vehicle, in particular said future driving path having been transmitted to the filtering device of the motor vehicle and/or predicted is used. Such an embodiment is in particular useful in turn whenever the motor vehicle is operated completely automatically, since then the future trajectory is cyclically planned and predicted anyway. However, the future trajectory also defines a future driving path, which can, for example, be transmitted to a control device connected to the surveillance cameras used for the traveled area, which also serves as a communications partner. The control device is then aware of which path the motor vehicle will take, so that it can classify objects along this path as relevant and transmit their positional data (and if necessary object information) to the motor vehicle. One exemplary embodiment of the present invention provides in this context that positional data of an object are transmitted to the motor vehicle, when the object is located in the driving path (expanded if necessary by a safety zone) and/or is located within the driving path at a time corresponding to the passing of the motor vehicle with a probability exceeding a probability threshold. The second of the mentioned possibilities is in particular useful whenever a forecast of the movement of the objects also takes place, which can then be used as an object information item. Ultimately, the objects detected by the surveillance cameras will be compared to the path of the self-driving motor vehicles, wherein whenever objects are in the path of a motor vehicle, their positional data will be transferred to the motor vehicle, so that only relevant information is forwarded and collisions can be prevented.

As part of the positional data, in particular in the case of a motor vehicle as an object, an orientation of the object can also be determined. To this end, provision can be made that, as part of the positional data, an orientation of the object to which they relate is determined by the evaluation of external features of the object. In the process it is conceivable to record the overall shape of motor vehicles and the like to determine a rough orientation, wherein more precise orientation specifications regarding specific, easily detectable features can likewise be determined. In concrete terms, provision can be made that, for determination of an orientation of a motor vehicle, such external features as a license plate of the motor vehicle and/or the exterior mirror of the motor vehicle are detected and analyzed in the image data. Both objects can be easily detected in image data, wherein for example so-called "Shape Matching Algorithms" can be used. A license plate of a motor vehicle, for example, usually forms a light rectangle, which is easy to detect. There is a direct correlation between its alignment and the orientation of the motor vehicle, which can be inferred accordingly. Similar image processing algorithms can also be used for the exterior mirrors of the motor vehicle. It should be noted that such external features of objects can of course also be used to determine object information, after having been detected.

Advantageously, absolute positions in a geodetic coordinate system and/or a coordinate system related to a traveled area are determined as positional data. The extrinsic as well as intrinsic positions of surveillance cameras can be determined by calibration. Thus, a transmission of the position of recognized objects from the camera coordinate system to a global coordinate system, for example, a coordinate system of the traveled area, is possible. To this end the extrinsic calibration values are used. Expediently, the positions obtained in the positional data relate to a coordinate system that the motor vehicle itself is familiar with, so that an immediate processing of the positional data can occur. In this context it should be noted that frequently in parking environments, in particular parking garages, card data are transmitted to the motor vehicle, which can relate to a specific coordinate system, which the motor vehicle can use, in order to navigate within the parking environment, automatically or by a driver supported by means of the card data. Then it is expedient to also configure the positional data to be specified as positions in this coordinate system.

One especially advantageous embodiment of the present invention provides that in one step of image processing, the evaluation, image data relating to a non-moving, static, in particular acquired background are withdrawn from further consideration. In the meantime, methods have become known making it possible, for example with the first use or a restart of the surveillance cameras, to program a static background such that it can be removed from subsequently recorded image data of the surveillance cameras so that the remaining image data contain only moved objects present in addition to the background. This tremendously simplifies the further evaluation of the image data, since said data only contains the moved or newly added objects, whose positional data is supposed to be determined from the image data.

Such an approach is known for example from an article by J. Jacques, C. Jung and S. Musse, "Background Subtraction and Shadow Detection in Grayscale Video Sequences", SIBGRAPI. IEEE Computer Society, 2005, Pages 189-196. In this article the authors propose merging the difference from a current camera image and the background through threshold values into a binary representation, wherein these binary images can be improved by morphological image operations. In particular, shadow effects are located there (through inhomogeneous illumination) and to the greatest extent possible removed. Such approaches can also be employed within the framework of the present invention.

Expediently, objects can be detected in the image data that have in particular had the background removed through clustering. Thus, neighborhood relationships of individual pixels are considered in order to form clusters that can belong to a common object. For example, provision can be made that clusters are considered as an object once they reach a threshold dimension.

In an advantageous improvement of the invention a tracking of a detected object can take place in image data recorded at different times using a Kalman filter. And extended Kalman filter can preferably be used in the process since it is better suited to predict the position of the object in the current image data in the case of non-linear motion paths and hence enable tracking. Tracking is expedient in particular whenever the path of the detected objects should be compared to the (transmitted) trajectories of highly automated motor vehicles.

It is noted here that the surveillance cameras are preferably time synchronized, in order to avoid timeouts wherever possible.

As already mentioned, the evaluation, in particular the determination of position lists, expediently occurs at least partially on the part of the surveillance camera and/or of a (or the) control device connected to the surveillance camera, in particular allocated to a driven area. Image processing devices that have been implemented on a stand-alone basis can be used, for example, in case it is not possible to integrate the image processing devices into the surveillance camera and/or the control device. Such data can then be sent to the motor vehicles as positional data, which can then be further processed in the motor vehicle; in particular as position lists filtered for the motor vehicle.

The inventive method can be implemented particularly advantageously in a parking environment having several parking spaces, in particular a parking garage, to which the surveillance cameras are allocated. As already mentioned, a plurality of today's parking garages already has surveillance cameras anyway, which can then have an additional advantage added. Thus, it is also expedient for other driven areas if the surveillance cameras serve the purpose of at least one additional function, in particular a safety function.

Along with the method, the invention also relates to a positional data determination and distribution system with the features of Claim 22 of the patent. All embodiments with respect to the inventive method can be analogously transferred to the inventive system, with which likewise the mentioned advantages can be retained. Especially preferably, such a positional data determination and distribution system can be used in a parking environment, for example a parking garage, wherein the communications device and the evaluation device are especially preferably integrated into a control device allocated to the parking environment. Of course, the evaluation device can also be partially distributed to the individual surveillance cameras.

Figure 2:
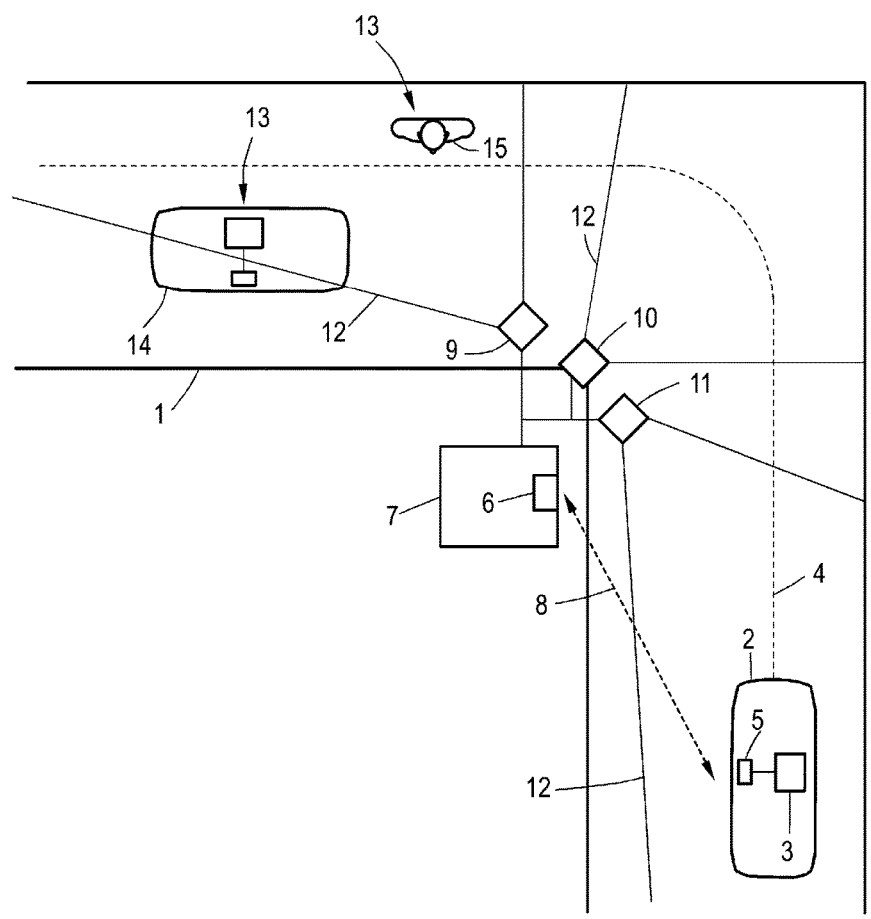
Figure 3:
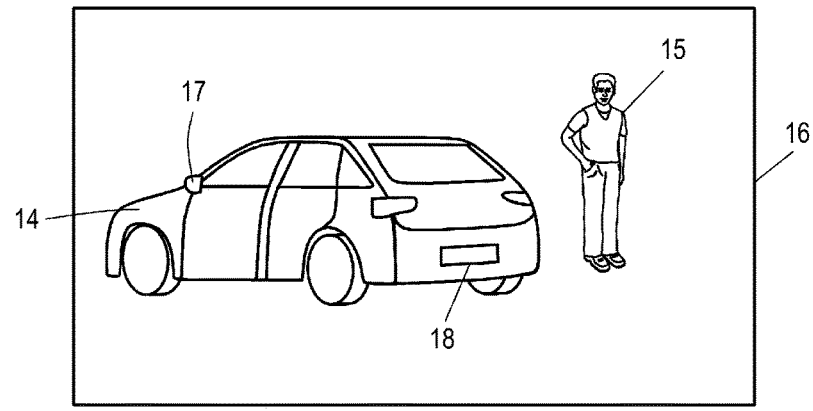

Further advantages and details of the present invention arise from the exemplary embodiments described in the following as well as with the assistance of the drawing. The figures show the following:

FIG. 1 a flow chart of the inventive method,

FIG. 2 a situation in a parking garage,

FIG. 3 a camera image from which a static background has been removed, and

Figure 4:
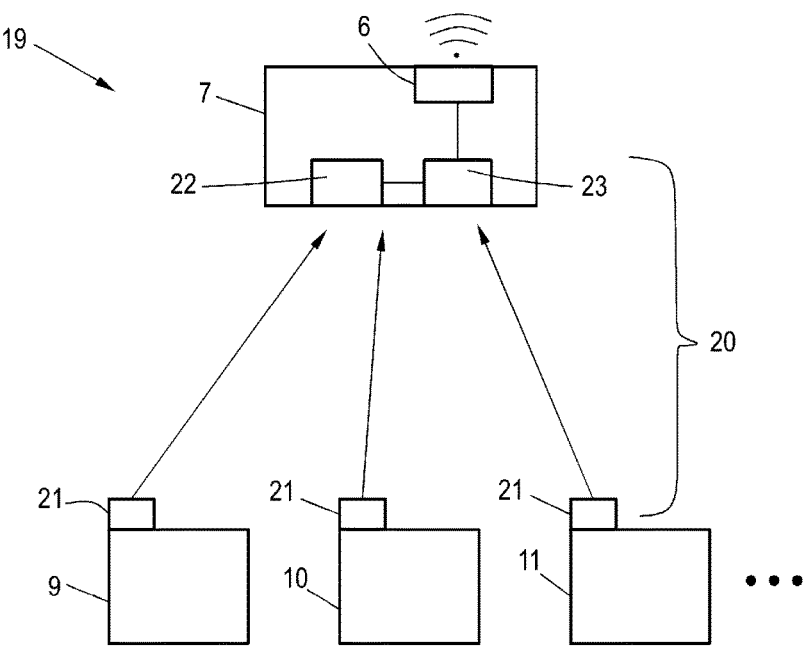

FIG. 4 an inventive positional data determination and distribution system.

One exemplary embodiment of the inventive method shall now be presented with regard to an application in a parking garage as a parking environment, wherein at least a portion of the motor vehicles in the parking garage are operated fully automatically, this means instead of being driven by a driver they are driven by a highly automated vehicle system configured for fully automatic operation of the motor vehicle. In the parking garage, there are a plurality of surveillance cameras which serve the purpose of a safety function and can, for example, be monitored by a person and/or whose image data can be recorded for a subsequent review. However, in the present case the surveillance cameras are also used to determine positional data, which can be used in the operation of the highly automated vehicle systems.

The surveillance cameras are connected to a central control device for the parking garage as an area traveled by the motor vehicles, wherein the control device has a communications device, via which a communication link to motor vehicles operated within the parking garage can be established, for example via WLAN. One possible WLAN would be the Standard 801.11p, which is often used in the automotive setting for motor vehicle-to-infrastructure-communication (car2x-Communication). Via this communication link, the control device can for one thing provide information to the parking garage, for example card data and information on free parking spaces; however, it is also possible for the motor vehicle, for its part in the present case in particular the inventive method, to transmit information useful for the control device to the control device, for example, trajectories of the highly automated operated motor vehicles and currently assumed position information. Trajectory data of the motor vehicles can be used on the part of the control device, for example, to perform its own verification of collision risks, since ideally the trajectories of all motor vehicles operated in the parking garage are available. In particular, however, the trajectory data and the position feedback of the motor vehicles can also be used to assign objects detected by the surveillance camera to communications partners, which in the following will be presented in greater detail. To this end a motor vehicle can in other respects also transmit identification data, for example, a license plate number, which can be compared to object information that can likewise be determined from the image data of the surveillance cameras, in order to allocate detected objects to communications partners. In particular with regard to the license plate number, but also with other object information serving the purpose of identification, provision can be made, that said information is only retained for a short period and, for example upon leaving the parking garage, is deleted again.

The detection ranges of the surveillance cameras cover to the greatest extent possible the drivable area of the parking garage, wherein the detection ranges of different surveillance cameras can definitely overlap.

In a Step S1, image data are recorded by the surveillance cameras. From these image data, a static, acquired background is removed in a Step S2. For this purpose, methods are already known in the prior art, wherein only by way of example reference is made to the article by J. Jacques et al. that has already been mentioned. After carrying out Step S2, the image data are free from the background.

In these image data that are free from the background, objects are identified by clustering in Step S3. Also for this purpose, a plurality of possibilities is already known in the prior art, said possibilities also being applicable within the framework of the present invention. Whenever an object has been detected, it is tracked, if necessary, also via several cameras, wherein, as already known in the prior art, preferably a Kalman filter is used in order to predict current positions of the object and thus facilitate an allocation. Since frequently there are nonlinear movements, in the present case an extended Kalman filter is used.

The position of detected objects in the camera coordinate system of the respective surveillance cameras can be determined after an intrinsic calibration of the camera. This happens in the present case in Step S4.

In Step S5 the intrinsic calibration of the surveillance cameras is further used to determine the position of the object determined in the camera coordinate system to an absolute position in a geodetic coordinate system and/or a coordinate system related to the parking garage, which in particular the motor vehicles also use, with the positional data being made available to said motor vehicles after completion of the evaluation of the image data described here. In this context it is particularly expedient if the object is contained in the overlapping detection ranges of several cameras, since then a more precise three-dimensional position can be determined, for example, by rear-projection methods. The extrinsic calibration of the surveillance cameras, which describes their relative positioning, can be used in this connection.

It should be noted here that in Steps S4 and S5 the positions can also be specified as comprising an orientation, in particular for objects of a specified class, preferably motor vehicles. To this end external features of the motor vehicles, for example their license plates and exterior mirrors, can be detected and analyzed in the image data, in order to infer an orientation.

In Step S6 further object information about the detected objects is determined, in the present case first at least an object class. Object classes indicate the type of object. Typical object classes to be used can be pedestrian, stroller, motor vehicle, two-wheeled vehicle and the like. Object classes can be detected via algorithms, which for example evaluate the shape and/or further features of the object, as they are visible in the image data, and compare them to the comparison data. Over several points in time, at which image data are recorded, the motion histories for the individual objects are also recorded as object information, which, as described above, are tracked. One further expedient information item, which then in particular can also be transmitted to the motor vehicles, is the speed of an object, which can likewise be determined from image data of sequential points in time. Of course a plurality of further object information can in principle be conceived and determined.

Collectively, in this way a position list comes into being for every surveillance camera using, for example, an image processing unit, which can be integrated in the surveillance camera or allocated to it, said position list containing the objects recorded by the surveillance camera, the associated positional data and the associated object information. This list is formed in Step S7 and in the present exemplary embodiment is forwarded to the central control device. In Step S7 the control device additionally merges the different position lists of the individual surveillance cameras into a single, final position list, by means of identifying multiple occurring objects through comparison of the positional data and/or the object information and then clearing the position list of objects recorded multiple times, for which purpose the extrinsic calibration of the surveillance cameras can be usefully taken into consideration. Also, the tracking data, in particular the motion history, proves useful in this context. Positional data or object information recorded by different surveillance cameras for the same object can also be summarized through statistical evaluation.

In a Step S8 the objects allocated to the object class motor vehicle are then checked to see whether they are allocated to a communications partner of the control device. To this end positional data and object information of the object classified as motor vehicle are compared to corresponding communications data of the motor vehicle, which can contain position information about the trajectory or logged protocol information as well as also a motion history, wherein the allocation of detected objects to communications partners can, however, also occur as an alternative or preferably additionally on the basis of other features, for example, of a license plate number extracted from the image, of a motor vehicle model or the like. However, it should also be noted that provision can also be made to transmit positional data to motor vehicles that was not recorded by the surveillance cameras because, for example, they are in a dead region, for which however the following statements correspondingly remain in effect, only that no positional data of the motor vehicle itself can be transmitted to the motor vehicle of the communications partner.

The following Steps S9 to S11 are carried out for each communications partner. First, for each communications partner a check is performed as to whether it has actually been recorded as an object, cf. to this end also the explanation for Step S8. If this is the case, the positional data of this object are added as positional data of the motor vehicle itself to a filtered position list to be transmitted to the motor vehicle. This happens in a Step S9.

In a Step S10 a check is performed for the other detected objects of the cleaned up, final position list, which is available to the control device, with the assistance of a relevance criterion as to whether these are relevant for the motor vehicle. In the present case, a future driving path with an additional safety zone arising from the planned trajectory of the motor vehicle is considered for this purpose. Objects that are located within this driving path and/or due to a projection will be located within this driving path (plus safety zone) whenever the motor vehicle passes the appropriate place, are to be considered relevant for the motor vehicle. The corresponding positional data are added to the filtered object list for this motor vehicle. This all happens in Step S10.

The position list filtered for a specified motor vehicle, that is a specified communications partner, can in addition be supplemented by at least a portion of the object information of the individual object, if said information is advantageous for use in the motor vehicle.

In Step S11 the filtered position list is finally transmitted to the respective communications partner, where it is used during the operation of at least one vehicle system.

Then the process continues with Step S1 for the next recorded image data of the surveillance cameras.

There are a plurality of possibilities for use of the positional data and object information received in the motor vehicle. The received filtered position list can in the process ultimately be understood as a type of virtual, external sensor of the motor vehicle. The data of the filtered position list can be considered for example for the updating of an environmental model of a motor vehicle and/or be directly included in the controller of the vehicle system, in particular of the highly automated vehicle system. The positional data of the motor vehicle itself, once transmitted, are redundant to further positional data determined with the on-board devices, so that they can be included in the determination of final position information of the motor vehicle to be used or can also be used for the review of further positional data and of position information. With respect to the positional data of objects other than the motor vehicle itself, different evaluations known in principle in the prior art can be performed, for example, with regard to adjustments of trajectories for the prevention of collisions.

For further explanation FIG. 2 shows a situation in a section 1 of the parking garage. A motor vehicle 2 having an active, thus highly automated vehicle system 3 designed for fully automatic operation of the motor vehicle 2, moves to a bend in the section 1, wherein the future trajectory 4 of the motor vehicle 2 is likewise shown. Between a communications device 5 of the motor vehicle 2 and a communication device 6 of the central device 7 there is a communication link 8. As already explained, the control device 7 is connected to the surveillance cameras, of which in the present case by way of example three surveillance cameras 9, 10 and 11 are shown along with their detection ranges 12.

The motor vehicle 2 itself lies in the detection range 12 of the surveillance camera 11 and is correspondingly detected there as an object, so that positional data of the motor vehicle 2 itself are determined.

Behind the bend of section 1 there are further objects 13, which cannot be recorded by environmental sensors of the motor vehicle 2 due to the bend. In the process, in the present case this is a further motor vehicle 14 and a pedestrian 15. These objects 13 are also recorded in position lists. As can be recognized, both the motor vehicle 14 as well as the pedestrian 15 are in the region of the planned trajectory 4 of the motor vehicle 2, which has also been transmitted to the control device 7, so that they are both to be classified as relevant for the motor vehicle 2, so that their positional data, after they are recorded from the detection range 12 of the surveillance camera 9, are transmitted via the communication link 8 to the motor vehicle 2.

In spite of the fact that the motor vehicle 2 cannot record the objects 13 with its own environmental sensors, it receives information in this respect and can for example adjust its planned trajectory 4.

FIG. 3 shows schematically a camera image 16 of the surveillance camera 9 with the background already removed, upon which both the motor vehicle 14 and the pedestrian 15 can be clearly recognized, together with features permitting the ascertainment of an object class and further object information. Especially highlighted in the present case are the exterior mirror 17 and the license plate 18, from which an orientation of the motor vehicle 14 can be derived; if necessary a license plate number can also be read out for the license plate 18.

FIG. 4 finally shows in the form of a simplified view an inventive positional data determination and distribution system 19, comprising first the surveillance cameras 9, 10 and 11 (as well as the further surveillance cameras of the parking garage). As part of an evaluation device 20, each of the surveillance cameras 9, 10, 11 is allocated an image processing unit 21, which creates the surveillance camera-specific position lists and forwards them to the control device 7, there in concrete terms a position list combination unit 22, which combines the position lists while removing double objects into a common, final position list. The filtered position lists are arranged in a filter unit 23 for the communications partners, which can then be purposefully transmitted via the communications device 6.

The evaluation unit 22 thus comprises in the present case the image processing units 21, the position list combination unit 22 and the filter unit 23.

The invention claimed is:

1. A method for determining positional data for use in operation of a vehicle system of a motor vehicle, comprising:
   receiving position lists from a plurality of surveillance cameras, wherein the plurality of surveillance cameras are external to the motor vehicle, and each surveillance camera is configured to record image data of at least a portion of surroundings of the motor vehicle or the motor vehicle, and cause a generation of a position list based on the image data, wherein the position list includes positional data for at least one object;
   combining the position lists from the plurality of surveillance cameras into a final position list, wherein the final position list comprises positional data for at least one moved object tracked by at least one surveillance camera among the plurality of surveillance cameras, and the combining comprises identifying identical objects in the plurality of position lists;
   filtering the final position list using at least one relevance criterion, wherein the filtering comprises selecting positional data of objects not corresponding to the motor vehicle; and
   transmitting the final position list to the vehicle system.

2. The method according to claim 1, wherein the vehicle system is a vehicle system designed for at least partially automatic operation of the motor vehicle.

3. The method according to claim 1, wherein the at least one surveillance camera is configured to determine positional data of the motor vehicle.

4. The method according to claim 3, wherein the at least one surveillance camera is configured to identify the motor vehicle based on a distance traveled, an existing position information item sent from the motor vehicle, or at least one external feature of the motor vehicle in the image data of the at least one surveillance camera, wherein the external feature comprises a license plate or a model designation badge.

5. The method according to claim 3, wherein the motor vehicle is configured to determine final position information for the motor vehicle based on the positional data of the motor vehicle.

6. The method according to claim 1, wherein the motor vehicle is configured to determine a collision probability with an object not corresponding to the motor vehicle based on the positional data of the objects not corresponding to the motor vehicle.

7. The method according to claim 1, the transmitting further comprising:
   transmitting the image data or the positional data of the objects to the motor vehicle for evaluation.

8. The method according to claim 7, wherein the at least one surveillance camera is connected to a control device allocated to a driven area, wherein the control device is configured to communicate with the motor vehicle.

9. The method according to claim 1, wherein at least one object information item associated with the positional data of the objects is determined for the at least one moved object tracked by the at least one surveillance camera and at least partially transmitted to the motor vehicle.

10. The method according to claim 9, wherein the at least one object information item is determined as an object class, an identification information item, a speed, a movement history, or a movement prediction.

11. The method according to claim 1, wherein the relevance criterion considering a driving path of the motor vehicle is transmitted to a filtering device of the motor vehicle.

12. The method according to claim 11, wherein positional data of an object is transmitted to the motor vehicle when it is in the driving path, wherein the driving path is extended by a safety zone or at a point in time corresponding to a passing of the motor vehicle with a probability exceeding a probability threshold.

13. The method according to claim 1, further comprising determining, by evaluation of external features of the object, an orientation of the object, wherein the orientation of the object is part of the positional data of the object.

14. The method according to claim 13, wherein the external features comprise a license plate of the motor vehicle or an exterior mirror of the motor vehicle.

15. The method according to claim 1, wherein absolute positions in a geodetic or a coordinate system related to a traveled area are determined as positional data.

16. The method according to claim 1, wherein each surveillance camera removes a non-moved, static, acquired background from the image data.

17. The method according to claim 1, wherein each surveillance camera is configured to detect objects in the image data that has had the non-moved, static, acquired background removed through clustering.

18. The method according to claim 1, wherein each surveillance camera tracks the detected object in the image data at different times using a Kalman filter.

19. The method according to claim 1, wherein the generation of the position list takes place at least partially on part of the at least one surveillance camera or a control device allocated to a driven area that is connected to the at least one surveillance camera.

20. The method according to claim 1, wherein the plurality of surveillance cameras are allocated to a parking environment having several parking spaces.

21. The method according to claim 1, wherein the surveillance cameras perform a safety function.

22. The method according to claim 1, wherein the motor vehicle is configured to determine a future trajectory of the motor vehicle based on the positional data of the objects not corresponding to the motor vehicle.

23. The method according to claim 1, wherein the motor vehicle is configured to create an environmental model of the surroundings of the motor vehicle based on the positional data of the objects not corresponding to the motor vehicle.

24. A positional data determination and distribution system, comprising:
- a plurality of surveillance cameras, wherein each surveillance camera is configured to:
  - record image data of at least a portion of surroundings of a motor vehicle; and
  - create, using an image processing unit, a position list based on the image data, wherein the position list includes positional data for at least one object; and
- a control device configured to:
  - combine the position lists from the plurality of surveillance cameras into a final position list, wherein the final position list comprises positional data for at least one moved object tracked by at least one surveillance camera among the plurality of surveillance cameras, and the combining comprises identifying identical objects in the plurality of position lists;
  - filter the final position list, wherein the filtering comprises selecting positional data of objects not corresponding to the motor vehicle; and
  - transmit the final position list to a vehicle system of the motor vehicle.

* * * * *